(12) United States Patent
Champion et al.

(10) Patent No.: US 8,854,929 B1
(45) Date of Patent: Oct. 7, 2014

(54) DISK DRIVE CALIBRATING LASER POWER AND WRITE CURRENT FOR HEAT ASSISTED MAGNETIC RECORDING

(71) Applicant: Western Digital Technologies, Inc., Irvine, CA (US)

(72) Inventors: Eric J. Champion, Longmont, CO (US); Christopher B. Wolf, San Jose, CA (US); Kroum S. Stoev, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/787,760

(22) Filed: Mar. 6, 2013

(51) Int. Cl.
  G11B 11/00 (2006.01)
  G11B 20/10 (2006.01)
(52) U.S. Cl.
  CPC .................. *G11B 20/10305* (2013.01)
  USPC .................. 369/13.26; 369/13.33; 369/13.13
(58) Field of Classification Search
  CPC .......... G11B 2005/0021; G11B 5/314; G11B 11/10595
  USPC .......... 369/13.26, 13.27, 13.33, 13.13, 13.32
  See application file for complete search history.

(56) References Cited

U.S. PATENT DOCUMENTS

| | | | |
|---|---|---|---|
| 5,032,879 A | 7/1991 | Buchmann et al. | |
| 5,392,273 A | 2/1995 | Masaki et al. | |
| 5,805,559 A | 9/1998 | Murakami et al. | |
| 6,046,970 A | 4/2000 | DeCusatis et al. | |
| 6,359,433 B1 | 3/2002 | Gillis et al. | |
| 6,671,248 B2 | 12/2003 | Miyabata et al. | |
| 6,771,440 B2 | 8/2004 | Smith | |
| 6,822,985 B2 | 11/2004 | Tsunekane et al. | |
| 6,965,357 B2 | 11/2005 | Sakamoto et al. | |
| 7,095,577 B1 | 8/2006 | Codilian et al. | |
| 7,116,689 B2 | 10/2006 | Pitman | |
| 7,161,882 B2 | 1/2007 | Lehr et al. | |
| 7,177,253 B2 | 2/2007 | Ishibashi et al. | |
| 7,478,007 B2 | 1/2009 | Farrell et al. | |
| 7,724,470 B2 | 5/2010 | Poon et al. | |
| 7,876,655 B2 | 1/2011 | Sasaki | |
| 7,898,759 B2 | 3/2011 | Matsumoto et al. | |
| 7,898,909 B2 | 3/2011 | Shimazawa et al. | |
| 8,243,388 B2 | 8/2012 | Shimazawa et al. | |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Tan X Dinh

(57) ABSTRACT

A disk drive is disclosed comprising a head actuated over a disk, wherein the head comprises a laser operable to heat the disk while writing data to the disk. An initial laser power of the laser is configured. After a time interval, an operating laser power of the laser is measured, and when the operating laser power falls below the initial laser power, a control signal applied to the laser is first adjusted until the operating laser power substantially matches the initial laser power. After first adjusting the control signal applied to the laser, a quality metric representing a recording quality of the head is measured, and when the quality metric indicates a poor recording quality, the control signal applied to the laser is second adjusted so that the operating laser power exceeds the initial laser power.

26 Claims, 7 Drawing Sheets

(56) References Cited

U.S. PATENT DOCUMENTS

| | | |
|---|---|---|
| 8,279,732 B2 | 10/2012 | Watanabe et al. |
| 8,369,191 B2 | 2/2013 | Shimazawa |
| 2002/0136115 A1 | 9/2002 | Kadlec et al. |
| 2004/0135595 A1 | 7/2004 | Chen et al. |
| 2006/0233061 A1 | 10/2006 | Rausch et al. |
| 2007/0014041 A1 | 1/2007 | Lille et al. |
| 2008/0080587 A1* | 4/2008 | Inomata ............. 374/45 |
| 2008/0158730 A1 | 7/2008 | Furukawa et al. |
| 2008/0204916 A1 | 8/2008 | Matsumoto et al. |
| 2009/0225464 A1 | 9/2009 | Juang et al. |
| 2009/0303629 A1 | 12/2009 | Nakano et al. |
| 2011/0205861 A1* | 8/2011 | Erden et al. ........... 369/13.27 |
| 2012/0134246 A1 | 5/2012 | Shimazawa |
| 2013/0170060 A1* | 7/2013 | Johns et al. ............. 360/31 |

OTHER PUBLICATIONS

Patrick Gale, "Estimating Laser Diode Lifetimes and Activation Energy", ILX Lightwave Application Note 33, Nov. 2008, http://www.ilxlightwave.com/appnotes/AN%2033%20REV01%20Estimating%20Laser%20Diode%20Lifetimes%20&%20Activation%20Energy.pdf.

* cited by examiner

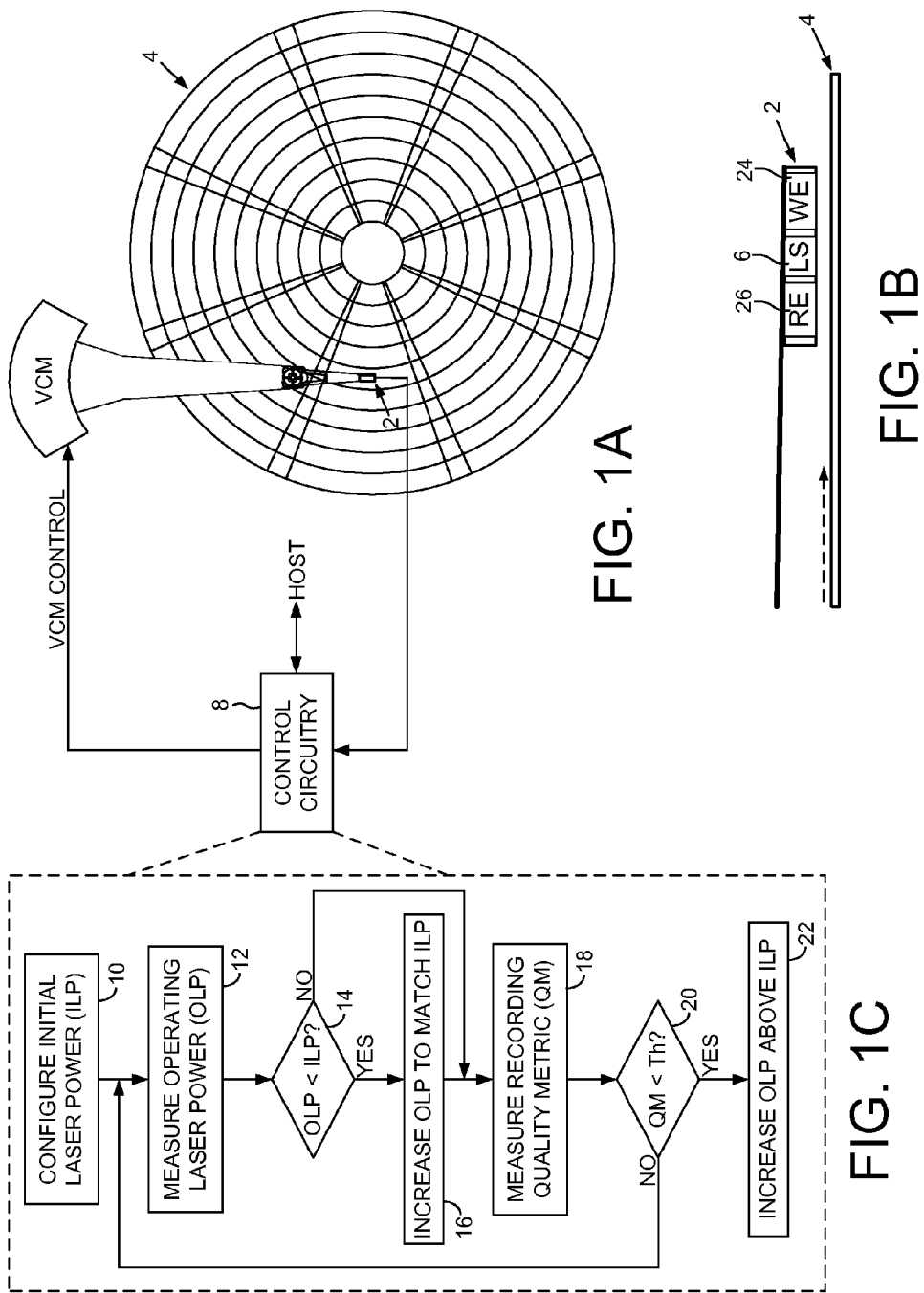

DISK DRIVE CALIBRATING LASER POWER AND WRITE CURRENT FOR HEAT ASSISTED MAGNETIC RECORDING

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIG. 1A shows a disk drive according to an embodiment comprising a head actuated over a disk.

FIG. 1B shows an embodiment of the head comprising a laser operable to heat the disk while writing data to the disk.

FIG. 1C is a flow diagram according to an embodiment wherein the operating laser power is maintained at an initial laser power, and then increased above the initial laser power when a quality metric representing a recording quality of the head falls below a threshold.

DETAILED DESCRIPTION

Figure 2A:
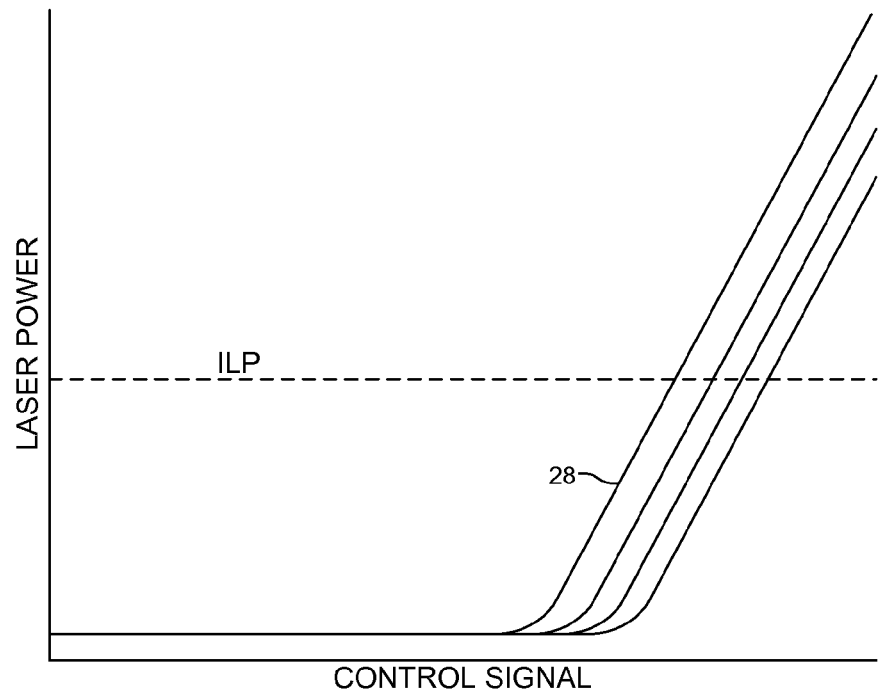
FIG. 2A shows curves of laser power versus a control signal (e.g., current or voltage) applied to the laser, wherein as the laser degrades over time the control signal must be increased to maintain the laser power at the initial laser power according to an embodiment.

FIG. 1A shows a disk drive according to an embodiment comprising a head 2 actuated over a disk 4, wherein the head 2 comprises a laser 6 (FIG. 1B) operable to heat the disk 4 while writing data to the disk 4. The disk drive further comprises control circuitry 8 operable to execute the flow diagram of FIG. 1C, wherein an initial laser power of the laser is configured (block 10). After a time interval, an operating laser power of the laser is measured (block 12), and when the operating laser power falls below the initial laser power (block 14), a control signal applied to the laser is first adjusted until the operating laser power substantially matches the initial laser power (block 16). After first adjusting the control signal applied to the laser, a quality metric representing a recording quality of the head is measured (block 18), and when the quality metric indicates a poor recording quality (block 20), the control signal applied to the laser is second adjusted so that the operating laser power exceeds the initial laser power (block 22).

In the embodiment of FIG. 1B, the head 2 comprises a suitable write element 24, such as an inductive write element, and a suitable read element 26, such as a magnetoresistive read element. In addition, any suitable laser 6 may be employed, such as a suitable laser diode. In one embodiment, the light emanating from a laser diode is passed through a waveguide and then through a near field transducer in order to focus an optical spot on the disk surface which heats the disk surface during write operations.

In one embodiment, the initial laser power is calibrated at block 10 of FIG. 1C during a manufacturing procedure which determines an optimal laser power based on any suitable criteria, such as recording quality as measured by any suitable quality metric. While the disk drive is deployed in the field, the laser 6 may degrade over time causing a reduction in the recording quality due to insufficient heating of the disk surface during write operations. For a laser 6 that degrades over time, there is a corresponding change in its electrical characteristic, such as an increase in its resistance, leading to a decrease in the operating laser power. In one embodiment, the heating performance of the laser can be recovered by increasing the control signal applied to the laser until the operating laser power again reaches the initial laser power. This is illustrated in FIG. 2A which shows a plurality of laser power curves relative to the control signal applied to the laser. The initial curve 28 illustrates how the initial laser power (ILP) is reached with a smaller amplitude control signal (e.g., a smaller current). As the laser 6 degrades over time, the amplitude of the control signal must be increased (the laser power curve shifts right) in order to maintain the operating laser power at the initial laser power, and therefore maintain substantially the same recording quality.

In some embodiments, one or more components of the head 2 may also degrade over time in addition to the laser 6. For example, the waveguide and/or the near field transducer may degrade such that the initial laser power calibrated during manufacturing may no longer be the optimal laser power. That is, if the manufacturing procedure were executed using a degraded waveguide or near field transducer, the initial laser power that achieves the desired recording quality shown in FIG. 2A would be higher. Accordingly, in an embodiment the operating laser power may eventually be increased above the initial laser power in order to compensate for other components of the head 2 degrading over time.

Referring again to the flow diagram of FIG. 1C which is periodically executed by the control circuitry 8 while the disk drive is deployed in the field, the operating laser power is increased when necessary to substantially match the initial laser power at block 16, and a quality metric is evaluated to verify whether the initial laser power still provides adequate recording quality. If the quality metric indicates a poor recording quality at block 20, the control signal applied to the laser is adjusted so that the operating laser power exceeds the initial laser power, and in an embodiment described below, the control signal applied to the laser is increased so that the quality metric achieves a desired value.

The operating laser power may be measured at block 12 of FIG. 1C in any suitable manner. In one embodiment, the operating laser power is measured by multiplying the current passing through the laser 6 by the voltage measured across the laser 6. In one embodiment, the control signal applied to the laser 6 controls the current passing through the laser 6, and the voltage across the laser 6 may be measured using a suitable analog-to-digital converter. In one embodiment, the initial and operating laser power is represented as the amplitude of the control signal multiplied by the voltage measured across the laser 6. That is, the relationship between the control signal applied to the laser 6 and the actual current passing through the laser 6 may not be known. In this embodiment, during the manufacturing procedure the control signal that generates the desired quality metric is calibrated, and then the initial laser power (ILP) shown in FIG. 2A is represented as the calibrated control signal multiplied by the corresponding voltage measured across the laser 6.

Any suitable quality metric may be evaluated during the manufacturing procedure when calibrating the control signal, as well as when verifying the recording quality at block 18 of FIG. 1C. For example, the quality metric may comprise one or more of an off-track read capability (OTRC), an error margin of a sequence detector, or a track width (magnetic write width) as measured using any suitable technique. In one embodiment, the quality metric is evaluated by writing a test pattern to the disk, and then reading the test pattern to generate one or more of the aforementioned metrics or other suitable metric.

Figure 2B:
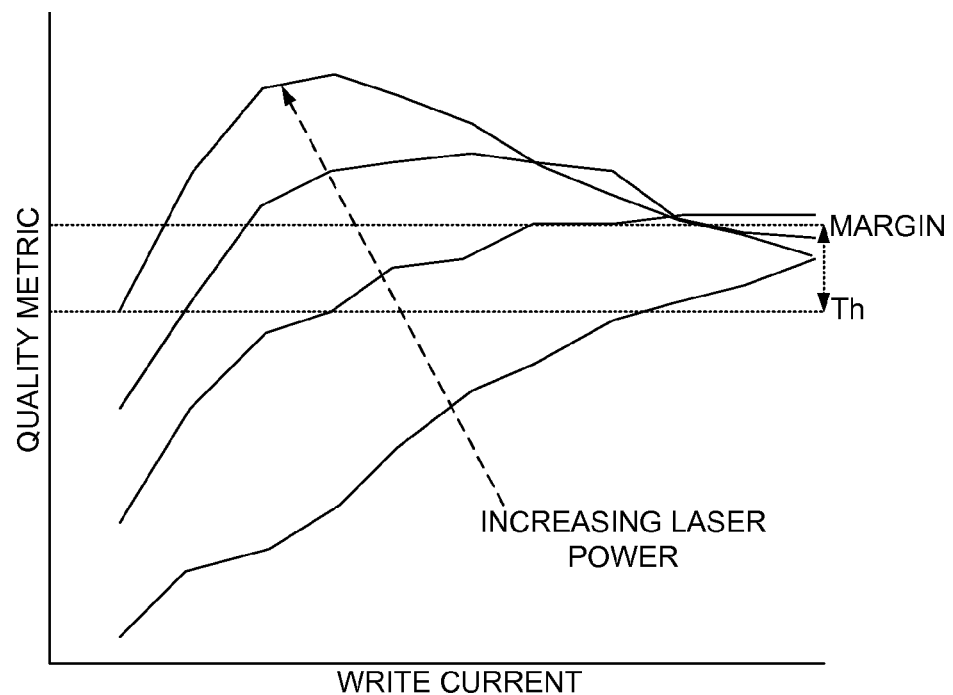
FIG. 2B shows quality metric curves versus an operating laser power and a write current according to an embodiment.
Figure 3:
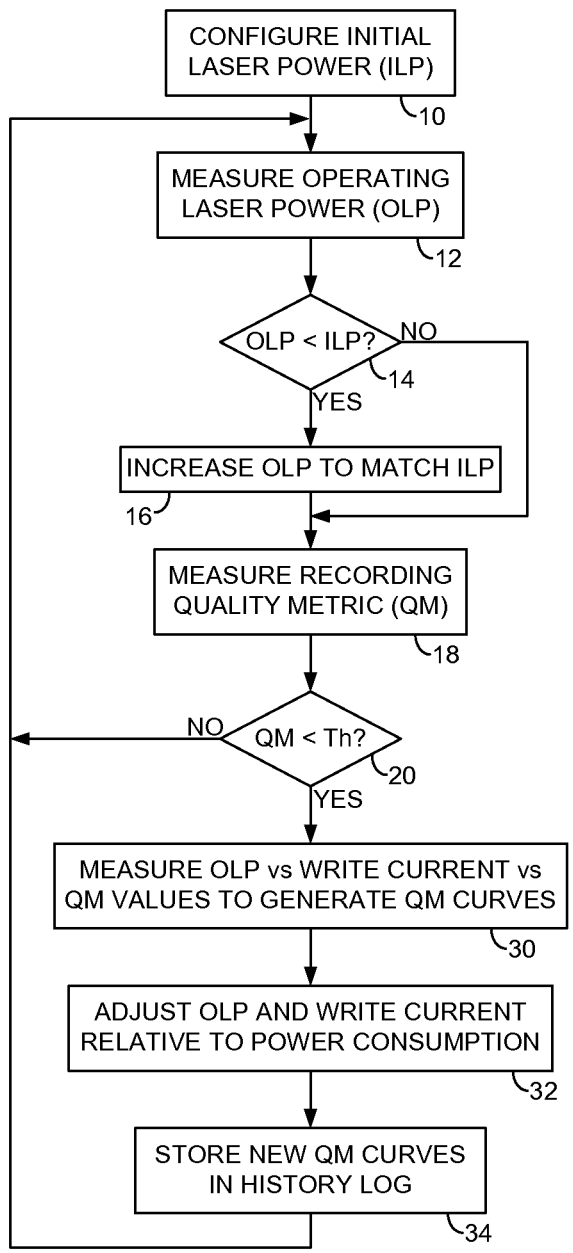
FIG. 3 is a flow diagram according to an embodiment wherein the operating laser power and write current are optimized relative to a power consumption of the disk drive.

FIG. 3 is a flow diagram according to an embodiment which expands on the flow diagram of FIG. 1C, wherein when the quality metric indicates a poor recording quality at block 20, the control circuitry 8 is operable to measure a plurality of operating laser power versus write current versus quality metric values, thereby generating a plurality of quality metric curves (block 30). An example set of quality metric curves is illustrated in FIG. 2B, where each quality metric curve corresponds to a different operating laser power (the curves increase in magnitude as the operating laser power increases). FIG. 2B illustrates how for a particular operating laser power the amplitude of the write current will affect the quality metric. Accordingly, in one embodiment when the quality metric falls below the threshold at block 20 both the operating laser power and the write current are adjusted so that the quality metric achieves a desired value based on the quality metric curves. In another embodiment, the operating laser power and the write current may be iteratively adjusted (separately or concurrently) until the measured quality metric achieves the desired value.

In the embodiment of FIG. 3, the operating laser power and the write current may be adjusted relative to a power consumption of the disk drive (block 32). For example, the operating laser power and the write current may be adjusted based on an optimal point in a space representing the quality metric curves shown in FIG. 2B that minimizes a power consumption of the disk drive while achieving the desired quality metric value. Once this point is identified, the corresponding settings for the operating laser power and write current may be selected based on this point in the QM curves. In another embodiment, the operating laser power and the write current may be iteratively adjusted (separately or concurrently) until achieving a desired power consumption of the disk drive (e.g., minimum power consumption) for a desired quality metric.

FIG. 3 also illustrates an embodiment wherein the quality metric curves measured at block 32 (e.g., as shown in FIG. 2B) are saved in a history log (block 34). Each time the quality metric curves are measured at block 32, the updated quality metric curves are again saved in the history log. In one embodiment, the history log of quality metric curves may be evaluated to predict a failure condition by detecting when the quality metric curves are approaching a critical condition. In another embodiment, the history log of quality metric curves may be uploaded to a manufacturer for use in evaluating the performance history of the head 2, such as the performance history of the laser 6 as well as the waveguide and near field transducer. This information may be useful in identifying and correcting fabrication and/or design flaws of the head 2. In one embodiment, the quality metric curves are stored as part of a Self-Monitoring Analysis and Reporting Technology (SMART) history log. That is, the format of the SMART history log may be extended to include a history of quality metric curves that are saved at block 34. In one embodiment, in order to reduce the size of the SMART history log a limited number of the quality metric curves may be saved, such by saving a predetermined number of the most recently generated quality metric curves.

Figure 4:
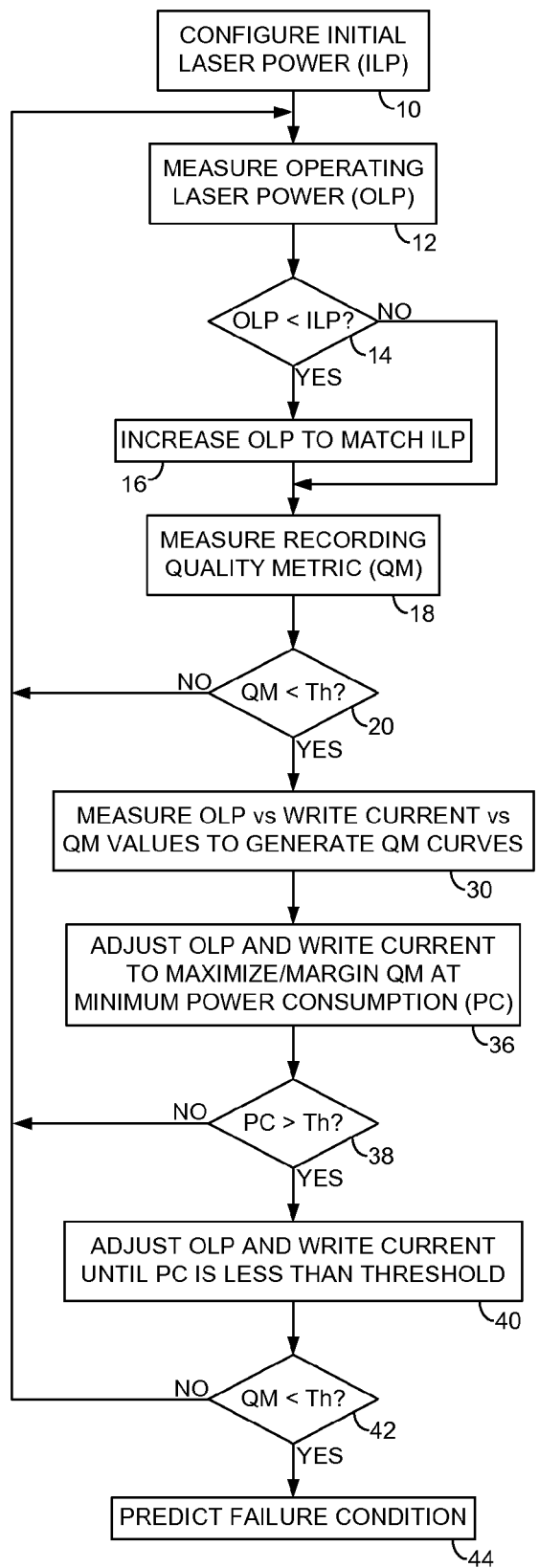
FIG. 4 is a flow diagram according to an embodiment wherein the operating laser power and the write current are optimized to reset a margin for the quality metric without exceeding a power consumption threshold for the disk drive.

FIG. 4 is a flow diagram according to an embodiment which expands on the flow diagram of FIG. 1C, wherein when the quality metric indicates a poor recording quality at block 20, the control circuitry 8 is operable to adjust the operating laser power and the write current in order to maximize the quality metric, or increase the quality metric by a margin above a target threshold (as illustrated in FIG. 2B) without exceeding a power consumption threshold of the disk drive (block 38). If after adjusting the operating laser power and the write current to achieve the desired quality metric value, the power consumption of the disk drive exceeds the power consumption threshold at block 38, then the operating laser power and write current can be adjusted until the power consumption falls below the power consumption threshold (block 40). That is, the operating laser power and write current can be adjusted to reduce the quality metric value until the power consumption falls below the power consumption threshold. If after adjusting the operating laser power and write current the resulting quality metric is below a threshold (block 42), such as the threshold shown in FIG. 2B, then the control circuitry can predict a failure condition (block 44) and take appropriate remedial action, such as notifying an end user of impending failure.

In one embodiment, the control circuitry 8 may interpolate the quality metric curves shown in the example of FIG. 2B in order to fill-in the operating laser power and write current settings that may fall between the actual settings used to generate the quality metric curves (i.e., fill in the empty space). The control circuitry 8 may then determine the optimal point in this interpolated space that corresponds to the desired quality metric value and power consumption using any suitable search algorithm.

Figure 5A:
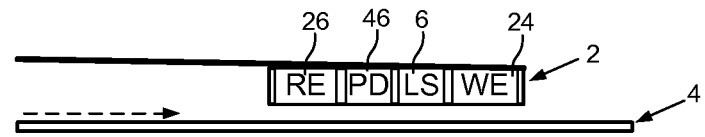
FIG. 5A shows an embodiment wherein the head comprises a photodiode for monitoring a mode stability of the laser.
Figure 5B:
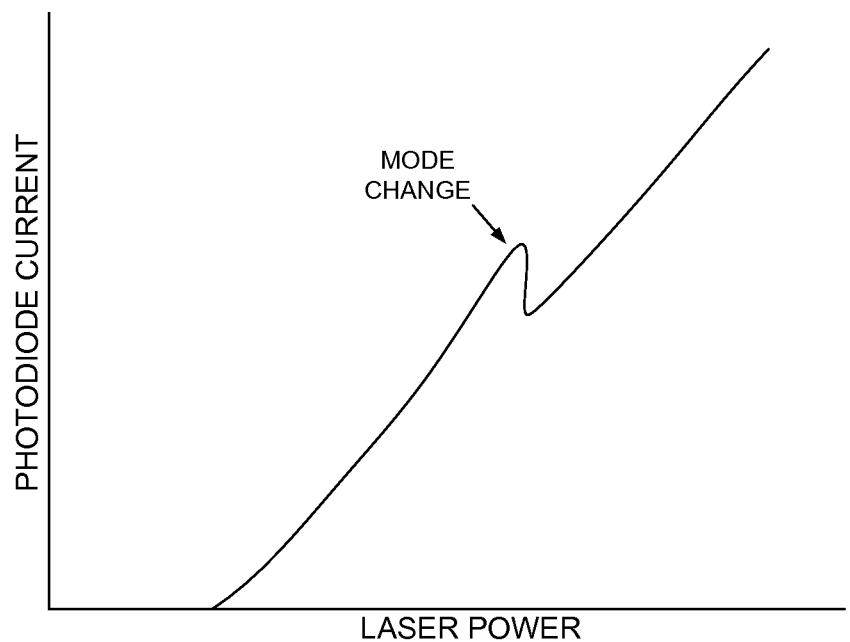
FIG. 5B shows an embodiment wherein the laser may exhibit a mode change at a particular laser power, wherein the likelihood of a mode change may increase as the laser degrades over time and/or with variations in the operating temperature.

FIG. 5A shows an embodiment wherein the head 2 comprises a suitable photodiode 46 operable to detect an intensity of light emitted by the laser 6. In one embodiment, the photodiode 46 may be used to calibrate the initial laser power at block 10 and measure the operating laser power at block 12 of FIG. 1C. In another embodiment, the photodiode 46 may be used to detect a mode change of the laser 6. In this embodiment the laser 46 may exhibit a mode change, for example at a particular operating laser power the laser may split into multiple frequencies, thereby reducing the intensity at the fundamental frequency used to heat the disk surface during write operations. In addition, the propensity of the laser 6 to exhibit a mode change may increase over the life of the disk drive as the laser 6 degrades over time, as well as with variations in the workload or the operating temperature. An example of a non-linear effect of a mode change is illustrated in the example of FIG. 5B which shows a step decrease in the intensity of the laser when the operating laser power reaches a particular level (where the level may vary based on degradation over time, as well as variations in the workload and the operating temperature).

Figure 6:
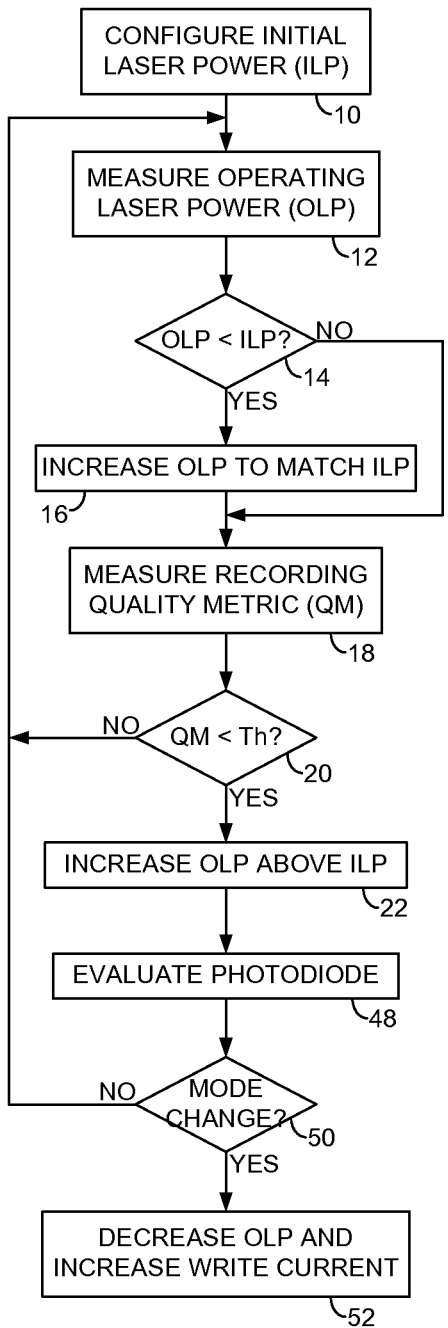
FIG. 6 is a flow diagram according to an embodiment wherein when a mode change of the laser is detected, the operating laser power is decreased and the write current is increased.

FIG. 6 is a flow diagram according to an embodiment which extends on the flow diagram of FIG. 1C, wherein when the operating laser power is increased at block 22, the photodiode is evaluated (block 48) to detect whether increasing the operating laser power caused a mode change. If a mode change is detected (block 50), the operating laser power is adjusted to compensate for the mode change. In the embodiment of FIG. 6, the operating laser power is decreased so that the laser reverts back to a single frequency mode, and the write current is increased to compensate for the decrease in the operating laser power (block 52).

Figure 7:
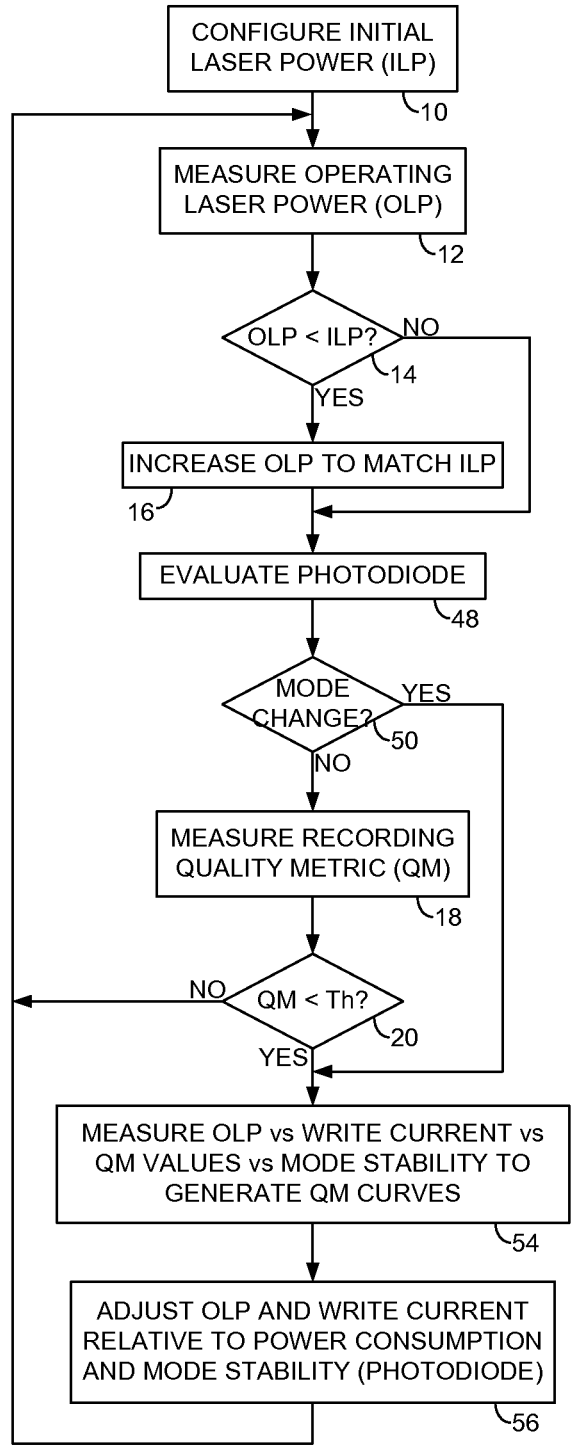
FIG. 7 is a flow diagram according to an embodiment wherein the operating laser power and write current are optimized relative to a power consumption of the disk drive and the mode stability of the laser.

FIG. 7 is a flow according to an embodiment which extends on the flow diagram of FIG. 3, wherein when a mode change of the laser is detected (block 50), the quality metric curves of FIG. 2B are measured over a plurality of different write current settings and for a plurality of different operating laser powers that maintain mode stability (block 54). That is, the quality metric curves of FIG. 2B are measured while limiting the maximum operating laser power so as to ensure the desired mode stability of the laser. The operating laser power and the write current are then selected based on the quality metric curves in order to achieve minimal power consumption as well as maintain the mode stability (block 56). As described above, the quality metric curves measured at block 54 may be stored in a SMART history log, and in one embodiment the operating temperature and workload history may also be stored with the quality metric curves. The operating characteristics of the laser may then be evaluated to determine its propensity to exhibit a mode change over variations in workload and operating temperature (as well as degradation over time), which may be used to improve the laser fabrication process and/or predict failure of the laser while the disk drive is deployed in the field.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk;
   a head actuated over the disk, wherein the head comprises
      a laser operable to heat the disk while writing data to the disk; and
   control circuitry operable to:
   configure an initial laser power of the laser; and
   after a time interval:
      measure an operating laser power of the laser;
      when the operating laser power falls below the initial laser power, first adjust a control signal applied to the laser until the operating laser power substantially matches the initial laser power;
      after first adjusting the control signal applied to the laser, measure a quality metric representing a recording quality of the head; and
      when the quality metric indicates a poor recording quality, second adjust the control signal applied to the laser so that the operating laser power exceeds the initial laser power.

2. The disk drive as recited in claim 1, wherein when the quality metric indicates a poor recording quality the control circuitry is further operable to increase a write current applied to the head.

3. The disk drive as recited in claim 1, wherein when the quality metric indicates a poor recording quality the control circuitry is further operable to adjust the control signal applied to the laser and adjust a write current relative to a power consumption of the disk drive.

4. The disk drive as recited in claim 1, wherein when the quality metric indicates a poor recording quality the control circuitry is further operable to measure a quality metric curve relative to an amplitude of a write current.

5. The disk drive as recited in claim 4, wherein when the quality metric indicates a poor recording quality the control circuitry is further operable to measure a plurality of the quality metric curves over a plurality of different operating laser powers for the laser.

6. The disk drive as recited in claim 5, wherein when the quality metric indicates a poor recording quality the control circuitry is further operable to select the control signal applied to the laser and select the write current based on an optimal point in a space representing the quality metric curves.

7. The disk drive as recited in claim 6, wherein the optimal point substantially minimizes a power consumption of the disk drive.

8. The disk drive as recited in claim 6, wherein the optimal point maximizes the quality metric relative to a maximum power consumption of the disk drive.

9. The disk drive as recited in claim 6, wherein the optimal point adds a margin to the quality metric without exceeding a power consumption threshold of the disk drive.

10. The disk drive as recited in claim 6, wherein the control circuitry is further operable to predict a failure condition when the optimal point corresponds to a power consumption of the disk drive exceeding a power consumption threshold.

11. The disk drive as recited in claim 5, wherein the control circuitry is further operable to save the plurality of the quality metric curves in a history log.

12. The disk drive as recited in claim 1, wherein the head further comprises a photodiode, and the control circuitry is further operable to:
    evaluate the photodiode to detect a mode change of the laser; and
    when the mode change is detected, adjust the operating laser power.

13. The disk drive as recited in claim 12, wherein when the mode change is detected the control circuitry is further operable to decrease the operating laser power and increase a write current applied to the head.

14. A method of operating a disk drive comprising a head actuated over a disk, wherein the head comprises a laser operable to heat the disk while writing data to the disk, the method comprising:
    configuring an initial laser power of the laser; and
    after a time interval:
        measuring an operating laser power of the laser;
        when the operating laser power falls below the initial laser power, first adjusting a control signal applied to the laser until the operating laser power substantially matches the initial laser power;
        after first adjusting the control signal applied to the laser, measuring a quality metric representing a recording quality of the head; and
        when the quality metric indicates a poor recording quality, second adjusting the control signal applied to the laser so that the operating laser power exceeds the initial laser power.

15. The method as recited in claim 14, wherein when the quality metric indicates a poor recording quality the method further comprises increasing a write current applied to the head.

16. The method as recited in claim 14, wherein when the quality metric indicates a poor recording quality the method further comprises adjusting the control signal applied to the laser and adjust a write current relative to a power consumption of the disk drive.

17. The method as recited in claim 14, wherein when the quality metric indicates a poor recording quality the method further comprises measuring a quality metric curve relative to an amplitude of a write current.

18. The method as recited in claim 17, wherein when the quality metric indicates a poor recording quality the method further comprises measuring a plurality of the quality metric curves over a plurality of different operating laser powers for the laser.

19. The method as recited in claim 18, wherein when the quality metric indicates a poor recording quality the method further comprises selecting the control signal applied to the laser and select the write current based on an optimal point in a space representing the quality metric curves.

20. The method as recited in claim 19, wherein the optimal point substantially minimizes a power consumption of the disk drive.

21. The method as recited in claim 19, wherein the optimal point maximizes the quality metric relative to a maximum power consumption of the disk drive.

22. The disk drive as recited in claim 19, wherein the optimal point adds a margin to the quality metric without exceeding a power consumption threshold of the disk drive.

23. The method as recited in claim 19, wherein the method further comprises predicting a failure condition when the optimal point corresponds to a power consumption of the disk drive exceeding a power consumption threshold.

24. The method as recited in claim 18, wherein the method further comprises saving the plurality of the quality metric curves in a history log.

25. The method as recited in claim 13, wherein the head further comprises a photodiode, and the method further comprises:
    evaluating the photodiode to detect a mode change of the laser; and
    when the mode change is detected, adjust the operating laser power.

26. The method as recited in claim 25, wherein when the mode change of the laser is detected, further comprising decreasing the operating laser power and increasing a write current applied to the head.

* * * * *